United States Patent Office 2,706,689
Patented Apr. 19, 1955

2,706,689

METHOD FOR THE PIGMENTATION OF VISCOSE

Marie Henri Agulhon, Paris, France, assignor to Manufactures de Produits Chimiques du Nord Etablissements Kuhlmann, Paris, France, a corporation of France No Drawing. Application November 2, 1951,
Serial No. 254,639

3 Claims. (Cl. 106—165)

The present invention concerns the pigmentation of viscose before transforming it, by spinning, into threads, ribbons and the like. It should be understood that the term "viscose" designates cellulose xanthate.

Cellulosic ethers of polyalcohols, of the type R—O—CH$_2$—CH$_2$OH such as glycol-cellulose, are known since long, the preparation of which may easily be effected by the reaction, at ordinary temperature, on the alkali-cellulose obtained in the same manner as in the preparation of viscose, either a mono-chlorhydrin of a glycol, or an oxide of the ethylene oxide type

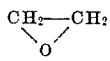

or propylene oxide

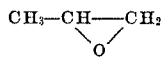

Cellulose derivatives are thus obtained, which are soluble in dilute alkalis, from which they can be precipitated by an acid. Such products provide the required properties allowing their application to the preparation of rayon or cellulose films. Their very high cost, however, makes such an utilization practically impossible.

It is known, in order to obtain matting effects on viscose threads and the so-called "mass" dyeing of the latter, to incorporate therein, before spinning, mineral pigments such as titanium oxide, by way of matting pigment and carbon black, or organic pigments such as colouring materials of the anthraquinone series and certain colouring azoic materials, insoluble in the naphthazol series.

The incorporation of these various pigments is effected, generally, during the "mixing" operation, i. e. the sodic dissolution of cellulose xanthate. The pigmented viscose thus undergoes all the filterings which are necessary in order to eliminate impurities from the viscose, which impurities might cause a plugging of spinnerets and the pigment grains which are too large to pass through the spinnerets are thus eliminated simultaneously. Such a process of pigmentation, however, lacks flexibility and makes changes in pigmentation difficult. Indeed, unless a multiple equipment is available for the treatment of viscose, it is necessary, every time a change of pigment is desired, to carry out a thorough cleaning of the tanks and pipes.

In order to obviate this drawback, a process has been used, consisting in introducing, into the viscose to be spun and immediately before spinning, a very concentrated suspension of the desired pigment, into a certain amount of the same viscose as that which is to be spun, this introduction being effected by a volumetric injection and thereafter passed in a paddle type mixer in order to provide a homogeneous mixture.

This process, however, also offers important drawbacks, due to the fact that, on the one hand, the suspension is very difficult to filter, and, on the other hand, it should be prepared in a minimum of time and immediately before its introduction into the viscose to be pigmented, due to the maturing of viscose and its sensitivity to spontaneous coagulation under the action of time and of the various adjuvants which are required, in some cases, by a fine suspension of the pigments.

The object of the present invention is a process which makes it possible to obviate the various above drawbacks and greatly facilitates the pigmentation of viscose before spinning.

This process essentially consists in introducing, in a manner known per se, into the viscose to be pigmented, before spinning, a concentrated solution of the desired pigment in an aqueous solution of a cellulose polyalcohol ether, for example glycol-cellulose or propylglycol-cellulose, and diluted sodium hydrate, the concentrations of this solution being preferably of the order of 3 to 6% for cellulose ether and 5 to 10% for sodium hydroxide.

The suspensions thus obtained are extremely fine and their stability makes it possible to preserve them for a sufficiently long time in order to allow a decantation of the large grains and a possible filtering of the suspensions without any coagulation or spontaneous thickening occurring. Due to this fact, the above mentioned pigment suspensions may be prepared a long time before they are used.

It should be noted that the introduction of such products in viscose does not affect the quality of the threads or ribbons produced.

Example 1

12.5 kilograms of titanium oxide are added to 100 litres of an aqueous solution of glycol-cellulose, corresponding to 4% cellulose ether and containing 5% of caustic soda, placed in a mixer.

A very stable homogeneous suspension is obtained, which can be easily de-aerated, and which may be either filtered or decanted in order to separate the grains of titanium oxide which are too large to pass through the nozzle used to spin the viscose to be pigmented.

This suspension may be incorporated to the viscose just before spinning, by a volumetric injection and thereafter passed through a mixer.

As an example of the stability of the suspension, it is stated that a sample stored during three months, had not completely decanted after that time.

Example 2

5 kilograms of synthetic indigo are incorporated in a crusher, into 100 litres of an aqueous solution of glycol-cellulose in diluted soda (4% cellulose ether and 5% caustic soda). A homogeneous suspension is obtained which can be filtered in order to separate the particles which are too large. The suspension is extremely fine and, a large portion thereof passes through a filter paper, the indigoids being, in a manner transformed into a colloidal suspension. Storage of such suspensions was possible for several months without leaving any appreciable deposit.

Such suspensions are used for obtaining blue tints in viscose in directly introducing the mixture therein, before spinning.

Colouring materials derived from indigo behave in a similar manner.

Idanthrenes and solanthrenes (colouring materials of the anthraquinone series) provide similar results.

Example 3

The procedure is the same as in Example 2, using lampblack as a pigment.

An extremely dispersed suspension is obtained, having the appearance of India ink, which can be stored for several months without decanting. It may be used for obtaining gray and black in viscose.

What I claim is:

1. A pigmentation process for viscose, before spinning, comprising the steps of preparing a stable, concentrated suspension of a pigment in a diluted aqueous solution of a lower hydroxy alkyl cellulose and sodium hydrate, and in introducing and mixing said suspension, before spinning, into the viscose to be pigmented.

2. A pigmentation process for viscose, before spinning, comprising the steps of preparing a stable, concentrated suspension of a pigment in a diluted aqueous solution, of 3 to 6% lower hydroxy alkyl cellulose and 5 to 10% sodium hydrate and in introducing and mixing said suspension, before spinning, into the viscose to be pigmented.

3. A pigmentation process for viscose, before spinning, comprising the steps of preparing a stable, concentrated suspension of a pigment in a diluted aqueous solution of 3 to 6% a cellulose ether, belonging to the group consisting of glycol-cellulose and propylglycol-cellulose and 5 to 10% sodium hydrate and of mixing said suspension, before spinning, with the viscose to be pigmented.

References Cited in the file of this patent

UNITED STATES PATENTS

| | | |
|---|---|---|
| 2,650,168 | Van Dijk et al. | Aug. 25, 1953 |

FOREIGN PATENTS

| | | |
|---|---|---|
| 231,808 | Great Britain | Nov. 30, 1925 |
| 503,349 | Great Britain | Apr. 5, 1939 |